C. B. PHILLIPS.
HOLDER FOR LAP ROBES.
APPLICATION FILED OCT. 9, 1908.
924,188.
Patented June 8, 1909.
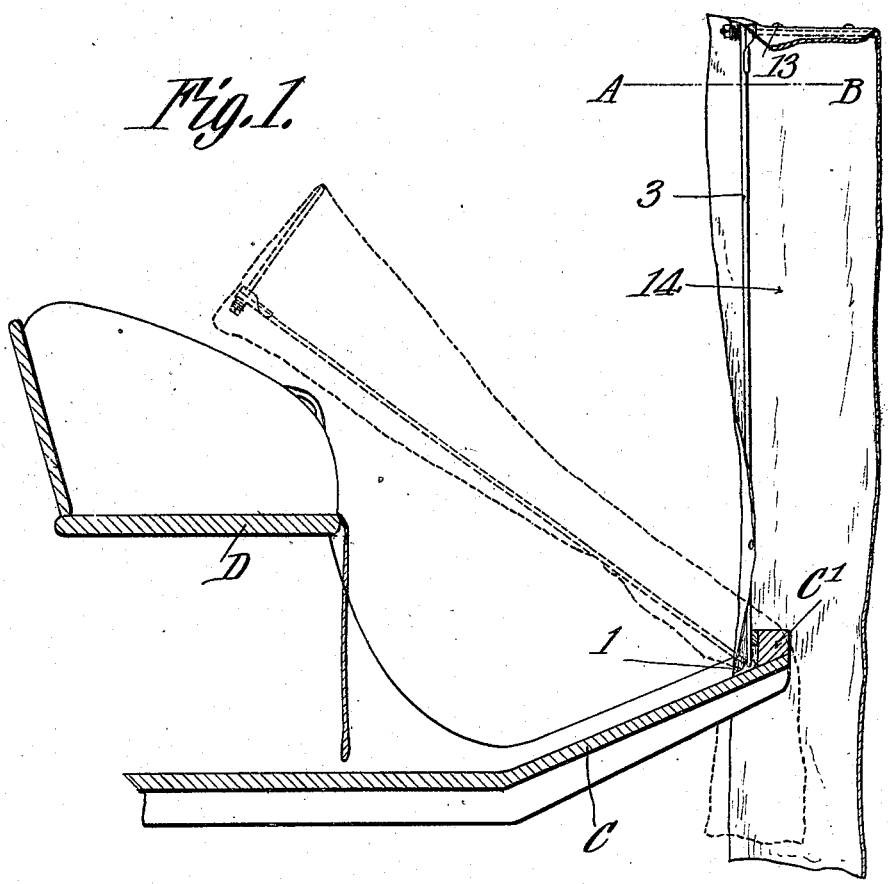
Fig. 1.
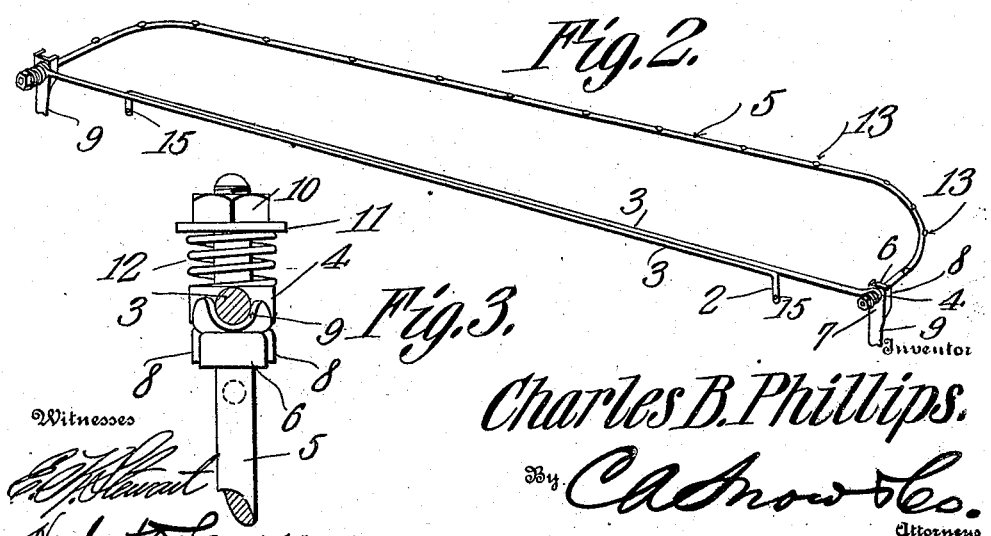
Fig. 2.
Fig. 3.
Witnesses
Inventor
Charles B. Phillips.
By C. A. Snow & Co.
Attorneys

UNITED STATES PATENT OFFICE.

CHARLES B. PHILLIPS, OF RED WING, MINNESOTA.

HOLDER FOR LAP-ROBES.

No. 924,188.　　　　Specification of Letters Patent.　　Patented June 8, 1909.

Application filed October 9, 1908. Serial No. 456,954.

*To all whom it may concern:*

Be it known that I, CHARLES B. PHILLIPS, a citizen of the United States, residing at Red Wing, in the county of Goodhue and State of Minnesota, have invented a new and useful Holder for Lap-Robes, of which the following is a specification.

This invention relates to attachments for vehicles and is more particularly a holder for lap-robes such as are used generally by drivers of hacks and other vehicles during stormy weather.

The object of the invention is to provide a light, durable and efficient attachment of this character which can be readily placed in position upon the foot-board of a vehicle and to which a lap-robe of rubber or other material can be fastened.

Another object is to provide an attachment which can quickly be shifted into position either in front of and away from the driver, or on the driver's lap.

A further object is to provide an attachment of this character which, when not in use, can be folded into a compact bundle so as to permit it to be stored below the seat of the vehicle or at any other desired point.

With these and other objects in view the invention consists of certain novel details of construction and combinations of parts hereinafter more fully described and pointed out in the claims.

In the accompanying drawings the preferred form of the invention has been shown.

In said drawings:— Figure 1 is a section through the attachment and through a portion of the vehicle to which it is applied, said attachment being shown in full lines elevated away from the feet, and, in dotted lines, lowered into the position assumed by it when resting in the lap of the driver. Fig. 2 is a perspective view of the attachment folded. Fig. 3 is an enlarged section on line A—B Fig. 1 and showing one of the supports in section.

Referring to the figures by characters of reference C designates the foot-rest of a vehicle and D designates the driver's seat. Secured to the foot-rest adjacent the front edge thereof and at the sides of the rest are eyes 1 constituting bearings for the inturned ends 2 of standards 3. These standards are formed preferably of metal rods provided with eyes 4 at their upper ends designed to receive the terminals of a substantially bow-shaped rod 5. The ends of this rod are screw-threaded and formed upon or secured to the rod adjacent each end is an angular collar 6. A retaining plate 7 is interposed between each eye 4 and collar 6 and is provided with parallel flanges 8 designed to extend along opposite sides of collar 6, so as to prevent the plate 7 from rotating upon the rod 5. The plates 7 are so mounted as to extend downwardly perpendicular to the plane occupied by the bowed rod 5, and the lower portion of each plate is rounded at its lower end so as to form a longitudinally extending concave seat 9. A nut 10 is mounted on each threaded end of the rod 5 and bears against a washer 11, there being a coiled spring 12 between each washer 11 and the adjoining eye 4, as clearly indicated in Fig. 3. Buttons or other suitable fastening devices 13 are arranged upon the rod 5 and designed to be engaged by the upper portion of a lap-robe 14 preferably formed of a water-proof fabric, such as ordinarily utilized in stormy weather.

It is of course to be understood that it is necessary to secure the inwardly directed ends 2 of the standards 3 within the eyes 1 in some manner, and I preferably utilize cotter-pins for this purpose, the same being extended through openings 15 formed in the end portions 2.

When it is desired to apply this attachment to a vehicle the eyes 1 are fastened to the foot-rest C close to the front cleat C' and the inwardly directed ends of the standards 3 are inserted into the eyes and secured by means of cotter-pins as heretofore described. It is of course understood that when the standards are thus disposed in parallel relation their upper portions are seated in the longitudinal channels or seats 9 formed by the plates 7, and by tightening the nuts 10 and forcing the springs 12 against the eyes 4, the standards are held firmly within the seats and there is no danger of the attachment sagging to either side. The lap-robe 14 is then attached to the upper rod 5. The lower portion of the robe extends down in front of the foot-rest as shown in Fig. 1, and the weight of the robe is sufficient to maintain the attachment in an upright position with the rods or standards 3 bearing against the cleat C'. The attachment when in this position does not interfere with the ingress or egress of the driver, and after he has once been seated, he can pull the attachment toward him so that the rod 5 will assume a position in his lap and the robe will thus assume a position to prevent rain etc., from coming into contact with the lower limbs and the lower portion of the body. When it is not desired to use the robe or the attachment, it is merely necessary to unscrew the nut 10 so as to relieve the stress of the springs 12 whereupon the rods can be shifted out of their seats 9 and swung toward each other so as to fold as indicated in Fig. 2. The entire attachment can then be placed in a small space such as ordinarily found below a vehicle seat.

It is of course to be understood that various changes may be made in the construction and arrangement of parts without departing from the spirit or sacrificing the advantages of the invention. For example, the means employed for detachably mounting the attachment on the foot-rest can be varied, and, if desired, instead of utilizing buttons for attaching the robe to the rod 5, straps or other suitable devices may be utilized.

What is claimed is:—

1. An attachment for vehicles comprising a supporting rod, standards connected to the end portions of said rod and foldable together, means carried by the rod and constituting seats for the standards, and spring-pressed means for yieldingly holding the standards upon their seats and at right angles to the plane occupied by the rod.

2. An attachment for vehicles comprising a supporting rod, standards pivotally connected to the end portions thereof and foldable together into the same plane with the rod, means carried by the rod and held against rotation relative thereto and constituting seats for the standards, and adjustable means for yieldingly holding the standards upon the seats.

3. An attachment for vehicles comprising bearing members, standards having inturned end portions detachably mounted within said members, a supporting rod movably connected to the standards, said standards being foldable together and into the plane occupied by the rod, and yielding means for holding the standards normally perpendicular to the rod.

4. An attachment for vehicles comprising a support, standards movably mounted thereon and foldable together into the plane occupied by the supports, seats for the standards and mounted upon, and held against rotation relative to the supports, and adjustable elastic means for holding the standards yieldingly upon the seats and perpendicular to the supports.

5. The combination with the foot-rest of a vehicle; of an attachment hingedly connected thereto and comprising a support, and standards movably connected to opposite ends of the support, said standards being detachably connected to the foot-rest and foldable toward each other and into the plane occupied by the support, and means upon the support for engaging a lap-robe.

6. The combination with the foot-rest of a vehicle; of a foldable lap-robe holder hingedly mounted thereon, means upon the foot-rest constituting an abutment for limiting the movement of the holder in one direction, spring-controlled means for preventing the holder from folding, and means upon the holder for detachably engaging a lap-robe and supporting it in front of the foot-rest and abutment.

In testimony that I claim the foregoing as my own, I have hereto affixed my signature in the presence of two witnesses.

CHARLES B. PHILLIPS.

Witnesses:
C. P. DUPENBROCK,
ALBERT JOHNSON.